Dec. 11, 1962 A. BEKEY 3,068,374
HYSTERESIS ELECTRIC MOTOR
Filed June 22, 1959 3 Sheets-Sheet 1
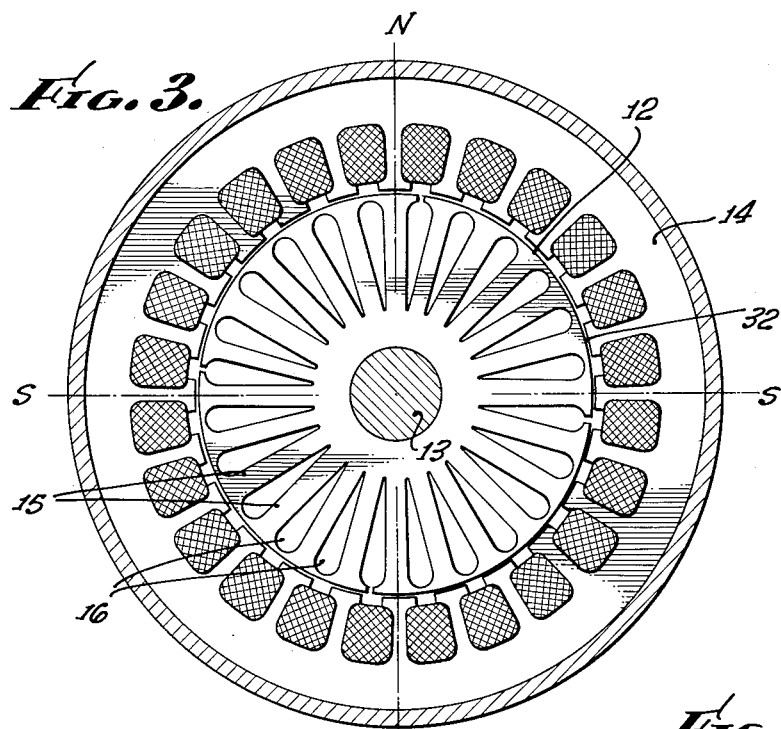
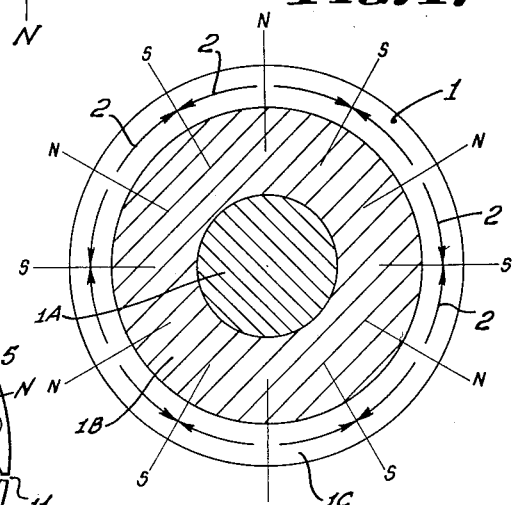
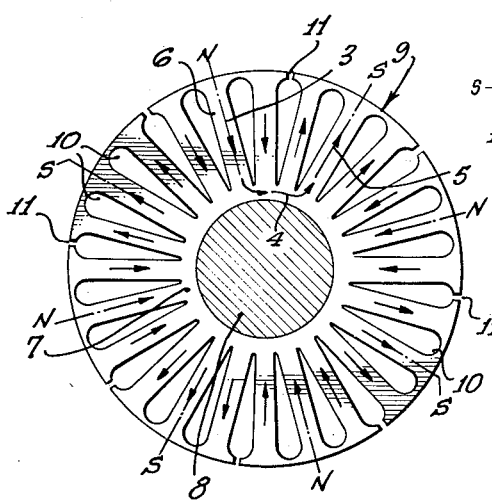
INVENTOR.
ANDREW BEKEY
BY
ATTORNEYS.

Dec. 11, 1962

A. BEKEY 3,068,374

HYSTERESIS ELECTRIC MOTOR

Filed June 22, 1959

INVENTOR.
ANDREW BEKEY
BY
ATTORNEYS.

Dec. 11, 1962 A. BEKEY 3,068,374
HYSTERESIS ELECTRIC MOTOR
Filed June 22, 1959 3 Sheets-Sheet 3

INVENTOR.
ANDREW BEKEY
BY
Smyth & Roston
ATTORNEYS

United States Patent Office 3,068,374
Patented Dec. 11, 1962

3,068,374
HYSTERESIS ELECTRIC MOTOR
Andrew Bekey, Los Angeles, Calif., assignor to Genisco, Incorporated, Los Angeles, Calif., a corporation of California
Filed June 22, 1959, Ser. No. 822,117
10 Claims. (Cl. 310—162)

The present invention relates to electric motors, and it relates more particularly to alternating current electric motors of the hysteresis type.

Hysteresis motors, in general, include a stator structure which is composed of magnetic material and which is usually of a laminated construction and of an annular configuration. The stator of the motor has a plurality of radially positioned slots formed in it, with the ends of the slots extending to its inner annular surface in the stator bore. One or more stator windings are disposed in these stator slots. The hysteresis motor also includes a rotor which is rotatably mounted in the stator bore in nested concentric relationship with the stator, and which defines an annular air gap between its peripheral surface and the inner annular surface of the stator. The rotor is usually formed of a solid cylindrical casting, or laminated stack, of magnetic material of relatively high coercivity.

When the stator winding is energized, a rotating magnetic field is established. This rotating magnetic stator field extends across the annular gap between the stator and the rotor of the motor in a generally radial direction, and it produces a reaction in the magnetic material of the rotor to cause the rotor to produce magnetic poles at its peripheral surface.

As the magnetic field produced by the stator is rotated, the poles induced at the peripheral surface of the rotor react with that field and cause the rotor to experience a torque. This phenomenon occurs, however, only if an angular displacement exists between the rotating stator magnetic field and the poles induced at the periphery of the rotor. That is, the radial poles induced at the surface of the rotor must be angularly displaced behind the polar positions of the rotating stator exciting field, for a torque to be exerted on the rotor. This angular displacement is due to the hysteresis of the rotor material, and hence the torque produced is a function of the hysteresis effect. The angular displacement referred to above is known as the "hysteric angle of lead $(\theta)$," or the "space phase angle."

It can be shown that the torque referred to above may be expressed by the following equation:

$$T = 11.3 P \cdot V \cdot W_h \qquad (1)$$

where:

T—hysteresis torque in oz.-inches
P—number of pairs of poles
V—volume of rotor in cubic inches
$W_h$—area of hysteresis loop of the rotor The hysteresis torque exerted on the rotor of the hysteresis motor is, therefore, proportional to the hysteresis loss in the magnetic material used for the rotor, as expressed by the area of its hysteresis loop; and the hysteresis torque is also proportional to the volume of the rotor. The hysteresis loss in the rotor is a function of the magnetic density of the flux in the rotor. Therefore, for large hysteresis loss with resulting large torque, the magnetic density of the flux in the rotor should be near saturation. At the same time, however, the volume of the rotor should also be optimized for a large hysteresis torque. An anomaly of the above criteria, however, is that the requirements are interdependent. That is, the larger the volume of the rotor in the presence of a given magnetic field, the lower is the magnetic density in the rotor. In other words, once a desired magnetic density in the rotor is assumed in the presence of a given stator flux, the volume of the rotor is thereby defined in the usual hysteresis motor construction, so that the available torque is thereby limited.

An important feature of the improved hysteresis motor of the present invention is a unique rotor structure which is such that rotor volume is optimized together with the flux density in the rotor.

As shown by the Equation 1, the hysteresis torque is also proportional to the number of poles in the motor. Also, as will be described in some detail subsequently, it can be shown that in a usual hysteresis motor, the volume of active rotor hysteresis material must be decreased as the number of poles is increased in order to maintain a required level of flux density in the rotor. That is, in a plurality of given prior art hysteresis motors, each with the same total stator flux and for each to have the same rotor magnetic density, the active rotor volume must be decreased in inverse relationship to the number of pole pairs in the different motors.

Therefore, in most prior art hysteresis motors, when it is attempted to increase the available torque by increasing the number of poles in the motor, a concomitant tendency to decrease the torque is encountered due to the necessary reduction of active rotor volume. Another feature of the improved rotor construction of the present invention is such that the torque of the hysteresis motor constructed in accordance with the invention actually increases in direct relationship with the number of poles used in the motor, and there is no necessity to decrease the volume of the active rotor material to maintain a required magnetic density in the motor.

Expressed in more specific terms, it can be shown that if the number of poles in a hysteresis motor of conventional prior art design is increased, assuming that the motor has a given stator bore, the annular portion of the rotor block which comprises the active rotor must become successively thinner as measured radially inwardly from the peripheral surface of the rotor so as to maintain the required flux density in the rotor. In a particular example, it has been found that the average depth of the active rotor of a two pole hysteresis motor with a 3-inch bore should be about three-quarters of an inch for a particular rotor magnetic density; while in a 12 pole motor for the same magnetic density in the rotor and for the same bore, the average depth of the active rotor must be reduced to about 0.125 inch. Thus, in the latter instance, the active portion of the rotor is reduced to about one-sixth of the total rotor volume for a corresponding constant hysteresis torque.

The reduction of active volume in the rotor material for the multipolar type of hysteresis motor is one factor in causing the size of such multipolar motors to be unduly large for a given mechanical output. However, the use of multipolar motors of the synchronous type is often desirable, especially where high line frequencies are encountered and it is desired to drive a shaft at a relatively low speed without the need for reduction gearing. Such use arises, for example, in the drive of magnetic memory drums, or magnetic tapes, by a motor coupled to a high frequency source. In this area, low shaft speeds are essential, and gear reduction is not possible because of the errors and noise introduced into the system by the usual present day mechanical reduction gears.

An important object of the present invention is to provide an alternating current synchronous motor of the hysteresis type, which motor is constructed in a unique and improved manner to operate efficiently from a high frequency electrical source and to drive a mechanical load at a relatively low speed in response to the electrical energy from that source.

The improved hysteresis motor of the present invention incorporates a rotor of magnetic material which is constructed in a manner to be described to maintain an optimum flux density in the magnetic material in the rotor, regardless of the number of poles of the motor, and without any necessity to reduce the volume of the active magnetic material in the rotor as the number of poles is increased. That is, the improved rotor of the present invention is constructed to obviate for all practical purposes the prior art necessity of "thinning" the radial dimension of the active material of the rotor as the number of poles of the motor is increased.

The improved construction described in the preceding paragraph results in a motor in which desired relatively high driving torques at relatively low speeds are attainable in motors of the hysteresis type having a relatively large number of stator poles and operating from a relatively high frequency source. Moreover, this desired condition is achieved without the need for excessively large rotor diameters, and resulting excessively large over-all motor sizes.

The invention possesses many other advantages, and it has other objects which may be made more clearly apparent from a consideration of the following specification in conjunction with the accompanying drawings. The illustrations of the drawings will now be described in detail, as illustrating the general principles of the invention. It is to be understood, however, that this detailed description is not to be taken in a limiting sense, since the scope of the invention is best defined by the appended claims.

In the drawings:

FIGURE 1 is a diagrammatic representation of the rotor of a usual prior art 12-pole alternating current synchronous motor of the hysteresis type, the diagram illustrating the paths of the magnetic flux in the prior art rotor, and the diagram being useful in the explanation of the advantages of the present invention;

FIGURE 2 is a cross-sectional view of an 8-pole rotor for a hysteresis motor mounted on an appropriate drive shaft, the illustrated rotor incorporating the concepts and principles of the invention and representing one embodiment of the invention;

FIGURE 3 is a cross-sectional view similar to the view of FIGURE 2, the cross-sectional view of FIGURE 3 illustrating the entire motor and further showing the configuration of the stator and stator windings and their relationship with the rotor;

Figure 5:
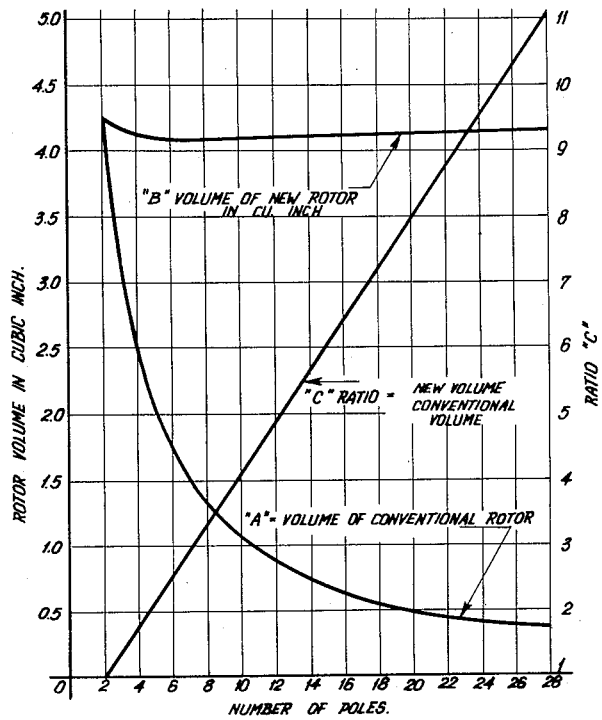
Figure 6:
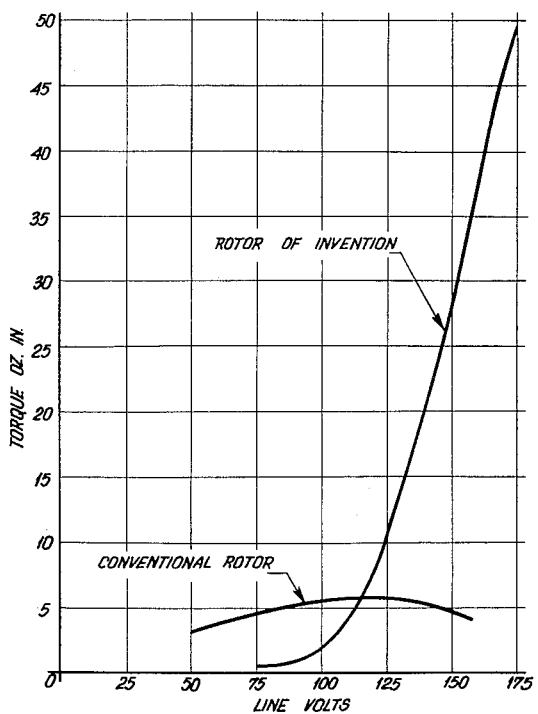
Figure 7:
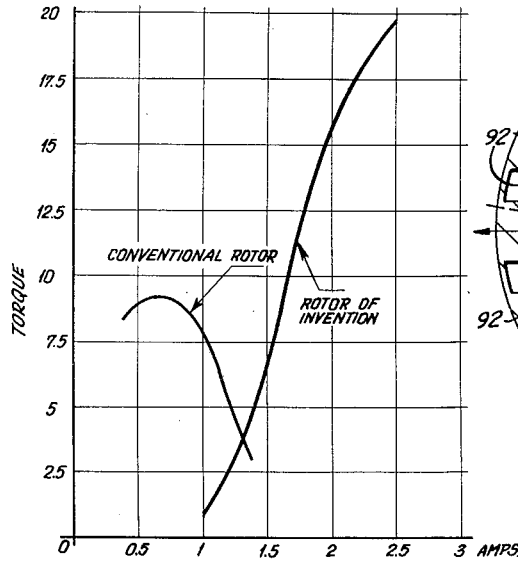
Figure 8:
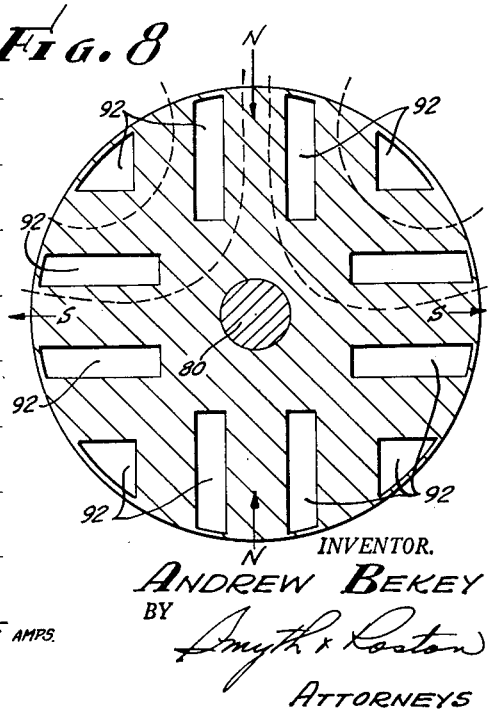

FIGURES 5, 6 and 7 are graphs illustrating comparisons between the operation of a hysteresis motor constructed in accordance with the present invention and the prior art usual type of hysteresis motor, these graphs being useful in describing the advantages of the motor of the present invention as compared with the prior art motors; and FIGURE 8 is a cross-sectional view of a 4-pole rotor for a hysteresis motor mounted on an appropriate drive shaft, this latter view also incorporating the concepts and principles of the invention and representing another embodiment of the invention.

The prior art rotor of FIGURE 1 which, as noted above, is intended to be used in an alternating current synchronous motor of the hysteresis type, is of an annular configuration and is designated as 1. The rotor may be composed of a suitable magnetic material of relatively high coercivity and which exhibits appreciable hysteresis losses. An appropriate material, for example is 17% cobalt steel. Such material is manufactured by the Simonds Steel Company, and is designated by them as Alloy No. 81. A similar suitable alloy is manufactured by the General Electric Company, and is designated by them as P6.

The prior art rotor 1 of FIGURE 1 is intended to be mounted on a shaft 1A for rotation in the bore of the stator of a hysteresis motor. The stator is constructed in accordance with usual practice, to produce a rotating magnetic field in its bore. This field exhibits a number of radial poles, twelve such poles being indicated in FIGURE 1. The radial poles exhibited by the rotating stator flux in FIGURE 1 are shown as alternating between north and south poles, and the field induces successive north and south poles about the periphery of the rotor 1. The rotor is formed of a hub 1B of non-magnetic material which is mounted on the shaft 1A and which supports a sleeve 1C of active hysteresis magnetic material.

The arrows 2 in the active portion 1C of the rotor 1 of FIGURE 1 indicate the directions of the magnetic flux in the rotor. It will be observed that the magnetic flux extends in a circumferential manner from each north pole induced in the rotor to the adjacent induced south poles. The total magnetic flux produced in the rotor 1 by the rotating stator flux is thereby divided into as many paths as there are stator poles. Accordingly, each path between the north and south poles produced on the peripheral surface of the rotor must be of such cross section as to produce a required high density of the magnetic flux in the rotor. This is because optimum hysteresis losses occur in the rotor, for optimum hysteresis torque, when the maximum flux density in the rotor is sufficiently high to drive the magnetic material in the rotor up to its saturating region.

It is apparent that as the number of stator poles is increased in the presence of a constant stator flux, the cross section of the rotor paths through which the flux passes must be reduced in the same proportion to maintain the desired high level of flux density in the rotor. In other words, in a twelve pole motor, the cross section of the rotor through which the magnetic flux passes must be only one-half the cross section of the rotor for a six pole motor to maintain the desired high level of flux density in the rotor. This obtains because there are twice as many paths in the rotor for the same total flux in the twelve pole motor as in the six pole motor. However, when the prior art rotor is formed of a reduced cross section to maintain this required flux density, the total volume of the rotor must be decreased. This, as shown in Equation 1, in itself causes the hysteresis torque to be decreased.

It follows, therefore, that in a prior art machine using a large number of stator poles, for example, from 60 to 120 poles; the hysteresis active annular portion of the prior art rotor must be made extremely thin to maintain the required high level of magnetic density in the rotor on which the developed torque is dependent. The resulting decrease in rotor volume in the prior art motors, however, decreases the total amount of torque possible by the prior art multipolar motors. Alternately, when appreciable torques are required in the multipolar prior art hysteresis motors, excessively large rotor diameters must be resorted to in order to minimize the cross section of the active annular portion of the prior art rotor, and yet provide a relatively large volume of active magnetic material in that annular portion. Therefore, in the multipolar hysteresis motors of the prior art, the available space is used most inefficiently because only a very small part of the rotor assembly may actually be used as an active hysteresis torque producing element.

As noted above, an important feature of the present invention is the provision of a rotor for a hysteresis motor, which rotor is so constructed that several times as much active hysteresis material can be used in its construction, as compared with the prior art motors. This enables a motor constructed in accordance with the present invention to provide a larger torque output for a particular rotor size. Moreover, the construction of the rotor in accordance with the present invention is such that the increased use of active hysteresis material does not produce a concomitant decrease in flux density in the rotor.

The following equations demonstrate the fact that in a usual prior art hysteresis motor, of a given rotor length and rotor diameter, the radial depth of the active hysteresis materials in the rotor must be changed in an inverse ratio to changes in the number of poles in the motor. This must be done in order to provide the magnetic density in the rotor required to maintain the torque producing hysteresis loop:

$$\phi = Bg.\pi.Dg.L \quad (2)$$

where:
$\phi$—Total flux in annular air gap
$Bg$—Flux density in annular air gap
$Dg$—Diameter of air gap (approximately equal to outer diameter of rotor)
$L$—Length of rotor Therefore, the flux density ($Bg$) in the air gap is given by:

$$Bg = \frac{\phi}{\pi.Dg.L} \quad (3)$$

From this the flux density ($By$) in the rotor yoke can be determined:

$$By = \frac{Bg.Dg}{Y.P} \quad (4)$$

where:
$P$ is number of poles
$Y$ is radial depth of rotor yoke

Therefore, to establish a particular maximum flux density in the rotor yoke, and if the other motor parameters and dimensions remain constant; the radial depth of the rotor yoke must be in accord with the following equation:

$$Y = \frac{1}{P.K} \quad (5)$$

where: $K$ is a constant

It will be seen from Equation 5, therefore, that if in a prior art hysteresis motor with a given rotor axial length and rotor diameter, the number of poles produced by the stator winding is changed, the depth of the rotor yoke must be changed in an inverse ratio to provide the same desired maximum flux density necessary to maintain the optimum hysteresis loop.

FIGURE 2 illustrates a rotor which is constructed in accordance with the concepts of the present invention, and which is intended to be used in an alternating current motor of the hysteresis type. The illustrated rotor has a unique configuration by which its over-all volume is more effectively utilized without militating against a desired high level of flux density in the rotor. The illustrated rotor in FIGURE 2 is assumed to be used in a motor exhibiting eight stator poles.

It will be remembered that in the prior art rotor illustrated in FIGURE 1, the magnetic flux extends from the north to the south poles along annular paths. The angular positions of the magnetic poles included in the rotor of FIGURE 2 may be represented by the lines labeled respectively "N" and "S." As before, the poles induced in the rotor of FIGURE 2 alternate between north and south poles around the periphery of the rotor. The magnetic path between the north and south poles in the rotor of FIGURE 2 may be represented, for example, by the illustrated arrows 3, 4 and 5.

The rotor 9 illustrated in FIGURE 2 is made up of a plurality of radial elements 6. These radial elements extend outwardly from an annular yoke member 7 at equiangular positions about the yoke. The rotor may be formed of a solid casting of essentially cylindrical configuration, or it may be made up of a plurality of stacked laminations. In each instance, the cross-sectional configuration of the rotor for the embodiment of the invention presently being considered is as illustrated in FIGURE 2. The solid or laminated rotor may be composed, for example, of appropriate hysteresis material, such as 17% cobalt steel, as noted above in the description of the prior art hysteresis rotors.

The yoke 7, therefore, joins the roots or inner ends of the radial elements 6. The yoke is keyed or otherwise fastened to a drive shaft 8. The drive shaft is rotatably supported in appropriate bearings, not shown. The radial elements 6 are joined at their outer ends by a sleeve-like annular rim portion. These radial elements 6 are separated by wedge shaped openings or slots 10 which, likewise, are equiangularly spaced around the axis of the rotor 9 and extend in a radial direction.

A plurality of slots 11 may be provided in the sleeve-like annular rim portion of the rotor 9, although they are not essential. At least as many of the slots 11 are provided as there are poles induced in the rotor, and the angular spacing between successive slots is made to correspond essentially to the angular spacing between successive ones of the induced poles. These slots 11 serve to interrupt the continuity of the annular rim portion of the rotor 9, and they prevent the flow of excessive flux densities around the rim of the rotor, which flow would provide an unwanted shunting effect on the poles formed at the periphery of the rotor.

The number of radial elements 6 may be chosen so as to produce a desired saliency effect in the rotor in that they form radial magnetic paths between adjacent north and south poles. The magnetic paths are represented, for example, by the arrows 3, 4 and 5. These radial elements 6 are designed to have such a cross section that the desired degree of magnetic density for optimum hysteresis loss is provided in the rotor for the designed stator flux. The radial width of the yoke 7 is also chosen to provide a particular cross section in the yoke for a desired high level flux density in the yoke.

By providing the radial elements 6, magnetic material can be used in the rotor throughout substantially the full cross-section of the rotor, such a cross-section being shown in FIGURE 2. Furthermore, the radial elements 6 are provided with parameters to obtain a high flux density in the elements. For example, such a high flux density can be attained by making the width of each radial element 6 relatively narrow.

Since the effective volume of the material utilized is increased while maintaining the flux density throughout the path relatively high, the output for a given rotor diameter of the hysteresis motor constituting this invention becomes increased in comparison to the output of hysteresis motors now in use. The output of the motor becomes increased because the increased travel path of the flux provides an increased opportunity for the flux to produce the hysteresis effects.

It will be appreciated that the increased travel path of the flux in the rotor can be obtained by the use of elements 6 which do not necessarily have to have a radial disposition. For example, the slots 10 can be tilted from a substantially radial direction to dispose the elements 6 in a corresponding tilted direction. The slots can actually even be disposed in an annular direction without departing from the intent of the invention to enhance the hysteresis effect in the rotor by increasing the volume of active material through the rotor while maintaining the flux density high throughout the length of the flux path.

The yoke 7 insures that the flux in the rotor has a continuous path of hysteresis material through the rotor. For example, the flux enters from the stator into the rotor, as indicated by the arrow 3. The flux then passes through the yoke 7 and returns from the rotor into the stator, as indicated by the arrow 4. The slots 11 are provided to insure that the flux has to pass through first elements 6, through the yoke and then through the second ones of the elements 6.

In the motor of FIGURE 3, a hysteresis motor 12 is shown as mounted on a rotatable drive shaft 13 and located within the bore of a stator 14. The stator 14 is of usual known annular form, and it includes a plurality of radially disposed slots which support the stator winding. These slots have open ends extending into the bore of the stator through its inner annular surface. In the illustrated instance, a four pole motor is illustrated in FIGURE 3.

The rotor 12 in FIGURE 3 has a plurality of radial elements 15 which are separated by slots 16, the elements 15 being equiangularly spaced about a central yoke which, in turn, is keyed or otherwise mounted on a shaft 13. The outer ends of the elements 15 are joined by a continuous or slotted annular sleeve, similar to the corresponding annular sleeve in FIGURE 2. In FIGURE 3 the radial depth of the yoke is greater than the yoke 7 of FIGURE 2 because the number of poles has been decreased in the motor of FIGURE 3.

By virtue of subdividing the material of the rotor 9 in FIGURE 2 and the rotor 12 in FIGURE 3 in such a way as to form elongated magnetic paths between adjacent rotor poles, the desired effects are produced. Moreover, the useful volume of magnetic material is greatly increased over that made possible by the prior art form of rotor shown in FIGURE 1; and this is achieved without sacrificing flux density in the rotor. Moreover, if the number of radial elements 15 is divisible by the number of poles, or if the pattern formed by these elements is symmetrical about the pole center lines, a desired saliency effect can be produced. Since the torque developed by the motor is a direct function of the volume of the active hysteresis material of the rotor, as discussed in conjunction with Equation 1, motors constructed in accordance with the invention produce substantially greater torques than the prior art hysteresis motors of comparable size and using the usual type of annular rotor. This advantage is particularly pronounced when the number of poles in the motor is large.

The rotor 9 of FIGURE 2 and the rotor 12 of FIGURE 3 may be most effectively produced by punching laminations. By such a technique, no serious problem is encountered in providing the uniformly spaced radial members and the radial slots separating the radial members. By providing a sufficient number of radial elements 6 in FIGURE 2 (or radial elements 15 in FIGURE 3) the rotor 9 in FIGURE 2 (or the rotor 12 in FIGURE 3) can be used interchangeably to cooperate with any number of stator poles so long as the number of radial elements of the rotor is at least equal the number of stator poles.

Figure 4:
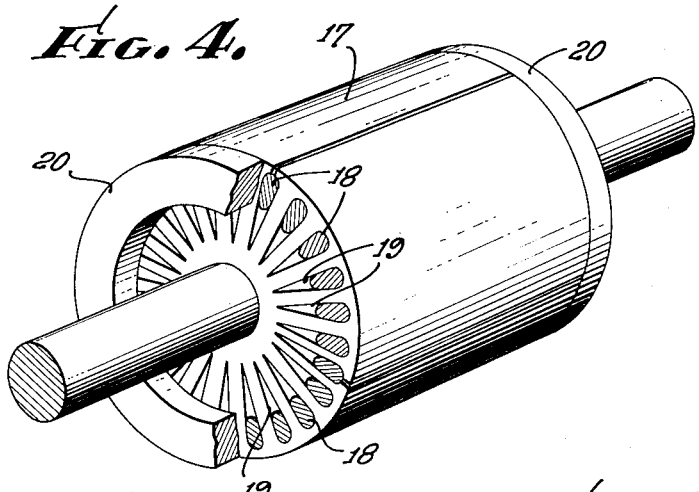
FIGURE 4 is a perspective view, partly in section, of a rotor for a hysteresis motor, which rotor also in incorporates the concepts of the present invention and which represents a second embodiment of the invention.

The hysteresis rotor shown in FIGURE 4 is designated as 17, and this rotor can be used in conjunction with any appropriate stator, like the stator shown in FIGURE 3. The rotor of FIGURE 4 is provided with a low resistance squirrel cage winding in order to improve its starting characteristics. The squirrel cage winding includes a plurality of electrically conductive bars or rods 18 which are formed, for example, of copper or aluminum. The rotor 17 of the motor of FIGURE 4 may be similar in other respects to the rotors 9 and 12 discussed above in conjunction with FIGURES 2 and 3. The bars 18 extend axially of the rotor and they are positioned in radial slots 19 between adjacent ones of the radial elements which make up the rotor 17. The bars 18 are placed adjacent the rim of the rotor 17, or they may extend radially to the bottoms of the respective slots 19, depending on the induction motor characteristics required.

The rotor 17 also includes a pair of end rings 20. These end rings are mounted at the opposite ends of the rotor 17 in electrical contact with the axial bars 18. The end rings are also formed of suitable electrically conductive material, such as copper or aluminum, and they are used to complete the squirrel cage structure.

As is well known in induction motor theory, during the starting of the hysteresis motor of FIGURE 4, large currents are induced in the squirrel cage winding 18, 20; and these currents establish magnetic fields which aid in rapidly bringing the rotor up to synchronous speed. When the rotor attains synchronous speed, the squirrel cage winding currents drop to zero. However, any departure of the rotor from synchronous speed causes the squirrel cage winding currents to be re-established, and these currents again set up a magnetic flux which reacts with the stator flux to return the rotor to synchronous speed.

It will be clear, therefore, that in accordance with the present invention, the hysteresis rotor of the motor is constructed so that its active hysteresis material is not restricted to a yoke or annular section so that the rotor flux is not constrained to follow substantially circumferential paths. Instead, the improved rotor of the invention includes two or more sections in which the rotor flux is oriented radially. These sections correspond, for example, to the salient field poles of a direct current excited synchronous motor. The inner yoke section of the rotor of the invention, such as the yoke 7 of FIGURE 2, can be completely eliminated if so desired, and the radial elements may extend directly out from the shaft 8. The shaft 8 should then be composed of a magnetic material to complete the magnetic paths for the rotor flux.

As described above, in the prior art annular shaped hysteresis rotor of FIGURE 1 in which the flux travels in circumferential paths, the active volume of the hysteresis material must be dictated by a maximum possible cross section in the flux path. If this maximum cross section is exceeded, the core will not be driven through its optimum $B/H$ hysteresis loop by the stator flux, and the developed hysteresis torque will be seriously weakened. This consideration, as noted above, becomes even more troublesome in the motor using a relatively large number of poles. This obtains because in the annular flux paths of the prior art hysteresis rotors of FIGURE 1, the flux density decreases as the number of poles is increased.

In the improved hysteresis rotor of the present invention, however, with its radial flux paths, the required flux density for optimum hysteresis losses can be maintained with a greater volume of active hysteresis material as compared with the prior art annular rotors. Moreover, the flux density through the radial elements of the improved rotor of the invention does not decrease at all when the number of poles are increased. Therefore, the relatively large volume of active hysteresis material can be retained in the hysteresis rotor of the invention for the multipolar type of motor.

Tests have been made comparing the performance of a motor utilizing two different rotors, one of the prior art annular type and the other constructed in accordance with the concepts of the invention and utilizing a plurality of radial elements separated by corresponding radial slots. In these tests, both the motors were operated as two-phase motors of 12 poles each, and a common stator was used for both. The stator has the following dimensions:

| | Inches |
|---|---|
| Outside diameter | 4.025 |
| Inside diameter | 3.100 |
| Length of stacked laminations | 5/8 |

The stator has 72 slots corresponding to 36 slots per phase. Accordingly, there are three slots per pole per face. There are 828 turns per phase. The winding was arranged as a sinusoidal concentric type.

The prior art annular rotor has an outside diameter of 3.090 inches and an inside diameter of 2.900 inches. The magnetic density in the rotor was calculated as 2.72 times the magnetic density in the air gap. The total volume of the active material was .56 cubic inches, and the length of the rotor was 5/8 inch. The rotor built in accordance with this invention has the same outside diameter and axial length, but the inside diameter was only 1.200 inches, with a yoke depth equal to that of the prior art rotor. Between this inner yoke and the air gap, thirty-two radial elements were arranged; the width of each element was .115 inch, resulting for this rotor, a magnetic density corresponding to 2.72 times the density in the air gap (the same as for the prior art rotor). The volume of active material contained in the rotor was 1.95 cubic inches in the radial elements and .252 cubic inches in the yoke, making a total of 2.20 cubic inches.

The motor was operated on two phases from a source of 400 cycles per second, and the applying electromotive force was adjusted in steps from 75 to 175 volts. The same procedure was followed after exchanging the prior art rotor for the rotor constructed in accordance with the concepts of the invention.

In FIGURE 5, the three curves A, B and C illustrate the advantages of the construction of the present invention as the number of poles of the motor is increased. The curve A, plotted against the number of poles, shows that in a prior art type of rotor the active volume of hysteresis material must be decreased very rapidly as the number of poles is increased in order that the required flux density in the rotor can be maintained. Curve B shows that the active volume of hysteresis material in a rotor built in accordance with the present invention may be substantially independent of the number of stator poles of the motor, and that this volume may even be increased slightly as the number of poles is increased. Curve C shows the ratio between the curves A and B to demonstrate the proportion of active hysteresis material in the rotor constructed in accordance with the invention as compared with the active hysteresis material in a usual annular prior art hysteresis rotor.

FIGURES 6 and 7 illustrate the results of the tests made on the motor described above. In FIGURE 6 the graph marked "Conventional Rotor" shows the torque for the 12 pole motor as the voltage is adjusted between 50 and 160 volts. The torque rises to a maximum value of a little over 5 ounce-inches.

The graph illustrating the rotor of the invention shows a relatively low torque at the lower voltages, but the torque increases rapidly as the line voltage exceeds 100 volts. The curve has a steep rise to values materially greater than the corresponding torques exhibited by the prior art type of rotor. The two curves shown in FIGURE 6 take into account factors corresponding to the increased voltage losses in the stator winding at higher output.

The effect of adjusting the current supplied to the stator is shown by the two curves in FIGURE 7. Here the prior art rotor curve shows that the maximum torque occurs at a current flow of about .7 ampere, this maximum torque being approximately 9 ounce-inches. When the rotor of the invention is substituted, the torque rises rapidly as the stator current is increased to 2.5 amperes. For example, at 2.5 amperes of stator current, the torque produced by the rotor constructed in accordance with the invention is nearly 20 ounce-inches; this being more than double the maximum torque exhibited by the prior art annular rotor.

The rotor elements, such as the elements 6 in FIGURE 2 need not necessarily be radial. In the embodiment of FIGURE 8, for example, a rotor 90 includes a pattern of slots 92 formed in it in such a manner that the rotor is divided into a plurality of elements which have a radially extending component but do not entirely extend radially. As before, the rotor 90 may be formed of a solid casting of essentially cylindrical configuration, or it may be made up of a plurality of stacked laminations. The rotor 90 may, likewise, be formed of appropriate hysteresis material, such as 17% cobalt steel. As illustrated, the rotor 90 has a central portion which forms a continuous magnetic path for the magnetic flux at the inner portion of the rotor. The rotor 90 is keyed, or otherwise fastened, to a drive shaft 80.

The invention provides, therefore, a new and improved rotor construction for an alternating current synchronous motor of the hysteresis type. In accordance with the concepts of the present invention, the active material in the rotor has a configuration such that at least a portion of the magnetic flux in the rotor is constrained to follow radial paths. As described in detail above, this provides for a more efficient rotor in which flux densities do not materially decrease as the number of stator poles is increased, and which permits a maximum volume of rotor material to be used without impairing the required rotor flux densities.

I claim:

1. A rotor for use with a stator in alternating current apparatus of the hysteresis type, a first member rotatable about a central axis, and a plurality of elongated members composed of magnetic material having hysteresis characteristics, the elongated members being provided with extended lengths and being disposed in spaced relationship to one another and being provided with parameters to obtain a substantially saturation density of the flux in the members and to obtain a linkage of this flux with the stator for providing a rotation of the elongated members and the first member about the central rotor axis from a standstill to a desired rotational speed.

2. In combination for use with a stator in alternating current apparatus of the hysteresis type, a first member rotatable about a central axis, a plurality of elongated members composed of magnetic material having hysteresis characteristics, the elongated members being disposed in spaced relationship to one another and being provided at spaced positions and being provided with parameters to obtain a high density in the members of the flux linking the members from the stator and being provided with a configuration to obtain a closed loop path for the flux and a return of the flux from the members to the stator, the elongated members being defined by slots between the members in which windings are disposed to facilitate accelerations of the motor.

3. In an alternating current apparatus of the hysteresis type, the combination of: a central member rotatable about a central axis, a plurality of elongated members composed of hysteresis magnetic material and extending outwardly from the central member at spaced angular positions for rotation with the central member about the central rotor axis, and an annular rim portion composed of hysteresis magnetic material bridging the extremities of said elongated members and in which said rim portion has a plurality of slots therein angularly disposed around its annular surface.

4. In an alternating current apparatus of the hysteresis type, the combination of: a central member composed of magnetic material and mounted for rotation about a central axis, a plurality of elongated members extending radially outwardly from the central member in magnetic coupled relationship with the central member for rotation therewith about the rotor axis and composed of hysteresis magnetic material, said central member forming a return path for magnetic flux in the elongated radial members, said elongated radial members being separated by a corresponding plurality of radial slots, electrically conductive material disposed in respective ones of the slots and extending axially of the rotor, and means for electrically connecting the axial extensions of the electrically conductive material to form a squirrel cage winding to assist in the starting of the motor and of maintain the motor at synchronous speed.

5. An alternating current synchronous motor of the hysteresis type: a stator structure having a central bore, a stator winding mounted in slots in the stator for producing a rotating multipolar magnetic flux, a shaft rotatably mounted in the bore of the stator at the central axis thereof, and a rotor composed of hysteresis magnetic material mounted on the shaft, said rotor having a plurality of elongate flux-carrying members extending substantially radially from the central axis, each of said flux-carrying members having a constant cross-sectional area throughout its length, and a substantial cylindrical yoke mounted on said shaft and contiguous with said elongate members.

6. A rotor for use with a stator in alternating current apparatus of the hysteresis type, said rotor comprising a first member rotatable about a central axis, a plurality of elongated members composed of magnetic material having hysteresis characteristics, the elongated members being disposed in spaced relationship to one another and being provided at spaced positions and being positioned to provide a primary closed loop path for the return of the flux from the stator.

7. A rotor for use with a stator in alternating current apparatus of the hysteresis type, said rotor comprising a first member rotatable about a central axis, a plurality of elongated members composed of magnetic material having hysteresis characteristics, the elongated members extending inwardly from the exterior of said rotor and being disposed in spaced relationship to one another, the elongated members being provided with a configuration to obtain a closed loop path for the flux and a return of the flux from the members to the stator, the elongated members being substantially saturated by said flux.

8. A rotor for use in an alternating current apparatus of the hysteresis type, comprising the combination of,
a central member rotatable about a central axis, a plurality of elongated members composed of hysteresis magnetic material and extending outwardly from the central member at spaced angular positions for rotation with the central member about the central rotor axis, the elongated members having a configuration to carry substantially all of the flux into said central member.

9. In an alternating current apparatus of the hysteresis type, the combination of:
a central member composed of hysteresis material rotatable about a central axis,
a plurality of elongated members composed of hysteresis magnetic material extendnig outwardly from the central member at spaced positions, and an annular rim portion composed of hysteresis magnetic material bridging at least a portion of the extremities of the elongated members, said rim and elongated members having dimensions to form primary flux paths that extend through said central member so that substantially all of said flux enters said central member.

10. The combination defined in claim 9 in which windings are disposed between the elongated members to facilitate accelerations of the central member and the elongated member.

References Cited in the file of this patent
UNITED STATES PATENTS

| | | |
|---|---|---|
| 1,917,173 | Warren | July 4, 1933 |
| 1,957,551 | Nierlich | May 8, 1934 |
| 2,769,108 | Risch | Oct. 30, 1956 |
| 2,913,607 | Douglas et al. | Nov. 17, 1959 |
| 2,927,229 | Merrill | Mar. 1, 1960 |